US009871330B2

(12) United States Patent
Seo et al.

(10) Patent No.: US 9,871,330 B2
(45) Date of Patent: Jan. 16, 2018

(54) WATERPROOF KEY APPARATUS

(71) Applicant: Samsung Electronics Co., Ltd., Suwon-si, Gyeonggi-do (KR)

(72) Inventors: Jaeil Seo, Suwon-si (KR); Daeyoung Noh, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 82 days.

(21) Appl. No.: 14/846,300

(22) Filed: Sep. 4, 2015

(65) Prior Publication Data

US 2016/0086745 A1 Mar. 24, 2016

(30) Foreign Application Priority Data

Sep. 22, 2014 (KR) ........................ 10-2014-0126116

(51) Int. Cl.

| | |
|---|---|
| ***H01H 9/04*** | (2006.01) |
| ***H01R 24/60*** | (2011.01) |
| ***G06F 1/16*** | (2006.01) |
| ***H01H 13/06*** | (2006.01) |
| ***H04M 1/23*** | (2006.01) |
| ***G06F 3/02*** | (2006.01) |
| *H04M 1/18* | (2006.01) |

(52) U.S. Cl.

CPC ........... *H01R 24/60* (2013.01); *G06F 1/1626* (2013.01); *G06F 1/1662* (2013.01); *G06F 3/0219* (2013.01); *H01H 13/063* (2013.01); *H04M 1/23* (2013.01); *H01H 2231/022* (2013.01); *H04M 1/18* (2013.01)

(58) Field of Classification Search

CPC ..... H04M 1/0266; H04M 1/00; G06F 1/1626; H01H 9/04; H01H 2231/00

USPC ......... 200/302.1; 455/566, 556.1, 556.2, 557

See application file for complete search history.

(56) References Cited

U.S. PATENT DOCUMENTS 5,258,592 A * 11/1993 Nishikawa ........... H01H 13/063 200/302.2
2008/0302641 A1* 12/2008 Su ............................ H01H 9/04 200/302.3
2014/0240911 A1* 8/2014 Cole ................. B29C 45/14311 361/679.3

FOREIGN PATENT DOCUMENTS

| | | | | |
|---|---|---|---|---|
| EP | 2728839 A1 * | 5/2014 | ....... G02F 1/133308 |
| KR | 10-2011-0097619 * | 8/2011 | ............. H01H 19/06 |
| KR | 10-2011-0097619 A | 8/2011 | |
| KR | 10-1270055 B1 | 5/2013 | |

* cited by examiner

*Primary Examiner* — Edwin A. Leon
*Assistant Examiner* — Iman Malakooti
(74) *Attorney, Agent, or Firm* — Jefferson IP Law, LLP

(57) ABSTRACT

A waterproof key apparatus, as an electronic device, is provided. The waterproof key apparatus includes a main case, a key module attached to a side of the main case and comprises a key actuator, a window to which the key module is coupled, a universal serial bus (USB) coupling module and a printed circuit board (PCB) attached to an opposite side of the main case, with a dome sheet therebetween, a key bracket and an antenna cap coupled to the lower portion of the PCB, and a sealing part attached between the main case and the PCB to seal the rear surface of the PCB.

11 Claims, 18 Drawing Sheets

240
180
220
300
310
340
360
380

100
320
340
500
520

WATERPROOF KEY APPARATUS

CROSS-REFERENCE TO RELATED APPLICATION(S)

This application claims the benefit under 35 U.S.C. §119 (a) of a Korean patent application filed on Sep. 22, 2014 in the Korean Intellectual Property Office and assigned Serial number 10-2014-0126116, the entire disclosure of which is hereby incorporated by reference.

TECHNICAL FIELD

The present disclosure relates to a waterproof key apparatus. More particularly, the present disclosure relates to a waterproof key apparatus that may implement waterproofing between a main case and a printed circuit board (PCB) by using a sealing rubber, may make a set light, slim, short, and small, and may remove a reason for a degradation in the feeling of clicking a key, in a smart device having physical keys on the surface thereof.

BACKGROUND

In general, a smart device has a physical key structure on the front surface thereof, and there are clearances for the operation of physical keys in the set.

However, liquid, such as water, infiltrates into the set through such clearances to cause short circuits and malfunctions in circuit components.

In order to prevent the problems, a waterproof structure is integrally applied to a key itself, or a waterproof membrane structure is applied between a key and a dome in a waterproof method for a physical key in the related art.

However, the waterproof structure integrally applied to the key has a complex structure and makes it difficult to decrease the size of the set.

For instance, in the case of a waterproof key integrated type using a waterproof tape, a water proof tape around a key prevents moisture from being introduced into a key hole, but occupies a double space together with a waterproof tape for a window.

Though unlikely, in the case of a waterproof key integrated type using a rubber sealing, a rubber waterproof structure using a rubber flange surrounds a key, and a so-called skirt structure is accordingly required between keys to improve the click feeling and occupies a large amount of space.

Also, a waterproof membrane structure applied between a key and a dome causes degradation in the feeling of clicking a key.

Namely, in the case of a separate waterproof rubber assembly type, a waterproof rubber having no hole is interposed between a key actuator and a dome to prevent the infiltration of moisture, but the feeling of click is necessarily deteriorated by the waterproof rubber between the key and the dome.

Further, an "L" shaped liquid crystal display (LCD) bracket structure made of a metal material has to be necessarily configured to implement a metal device antenna (MDA) that uses an LCD bracket on the front surface thereof, a printed circuit board (PCB), a universal serial bus (USB), and the like, as an antenna radiator.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a waterproof key apparatus in which a waterproof structure is separated from a key by implementing waterproofing using a sealing rubber between a main case and a printed circuit board (PCB), thereby making a set light, slim, short, and small, and a waterproof membrane structure between an actuator and a dome of a key is removed, thereby enhancing the feeling of clicking a key.

In accordance with an aspect of the present disclosure, a waterproof key apparatus of an electronic device is provided. The waterproof key apparatus includes a main case, a key module attached to a side of the main case and comprises a key actuator, a window to which the key module is coupled, a universal serial bus (USB) coupling module and a PCB attached to an opposite side of the main case, with a dome sheet therebetween, a key bracket and an antenna cap coupled to the lower portion of the PCB, and a sealing part attached between the main case and the PCB to seal the rear surface of the PCB.

In accordance with another aspect of the present disclosure, a waterproof key apparatus of an electronic device is provided. The waterproof key apparatus includes first and second main cases, a key module attached to the second main case and comprises a key actuator, a PCB mounted on the lower portion of the first main case, with a dome sheet therebetween, and a sealing part attached between the first main case and the PCB to seal the rear surface of the PCB.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 7 is for explaining an example in which a room created when a rear surface of a printed circuit board (PCB) is assembled is used as a resonance box of a speaker according to an embodiment of the present disclosure;

FIG. 8 is a perspective view for explaining a method of implementing a metal device antenna (MDA) according to an embodiment of the present disclosure;

FIG. 10B illustrates a sequence in which a waterproof structure for one button key and left and right touch keys is assembled according to an embodiment of the present disclosure;

FIG. 11 illustrates a sequence in which a waterproof structure for one button key to which a sensor is attached and left and right touch keys is assembled according to an embodiment of the present disclosure;

FIG. 12 is an exploded perspective view illustrating a waterproof structure for a side key according to an embodiment of the present disclosure;

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein may be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
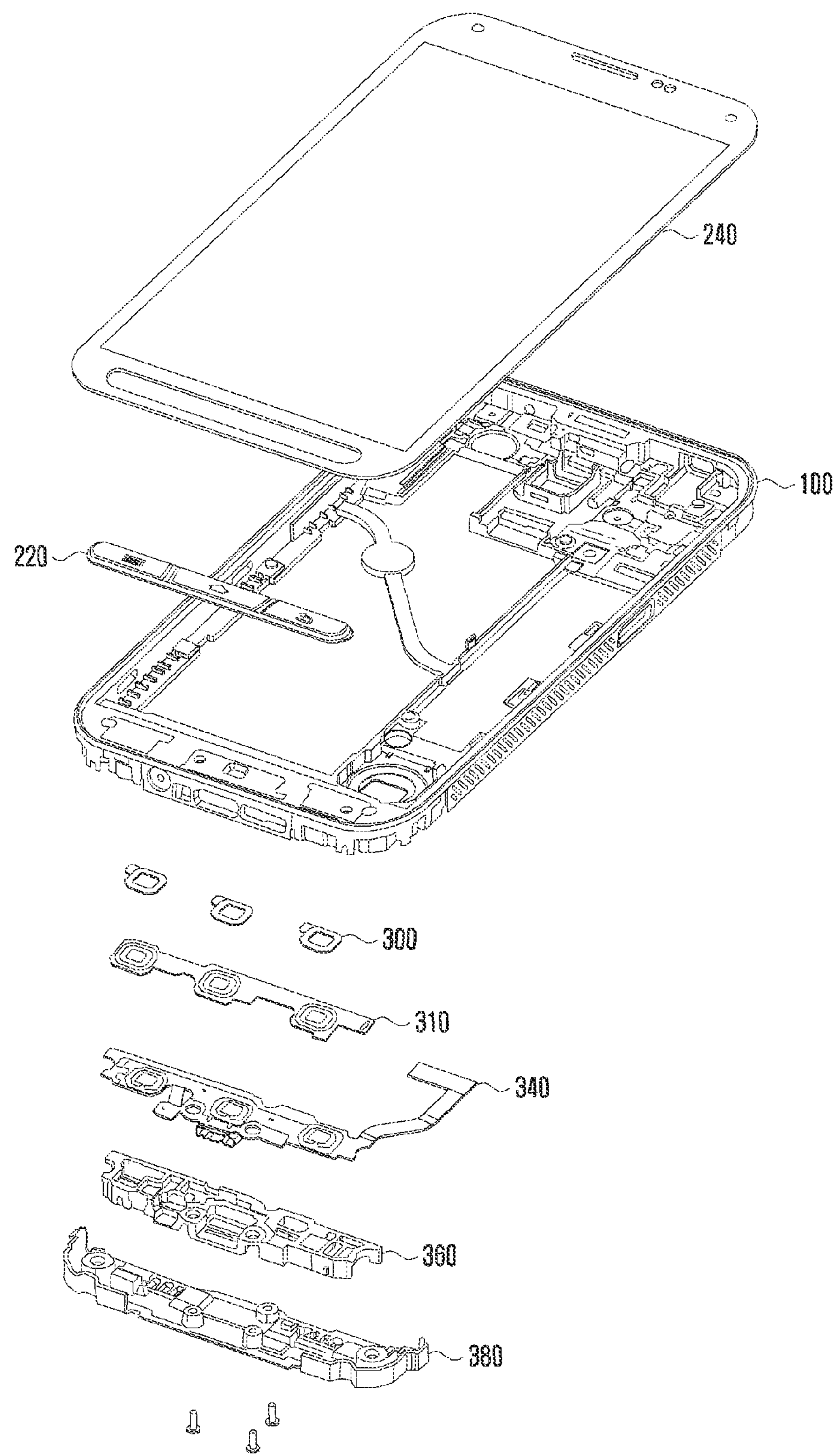
FIG. 1 is a front exploded perspective view of a set to which a waterproof key apparatus is applied according to an embodiment of the present disclosure.

FIG. 1 is a front exploded perspective view of a set to which a waterproof key apparatus using a sealing rubber is applied according to an embodiment of the present disclosure.

Figure 2:
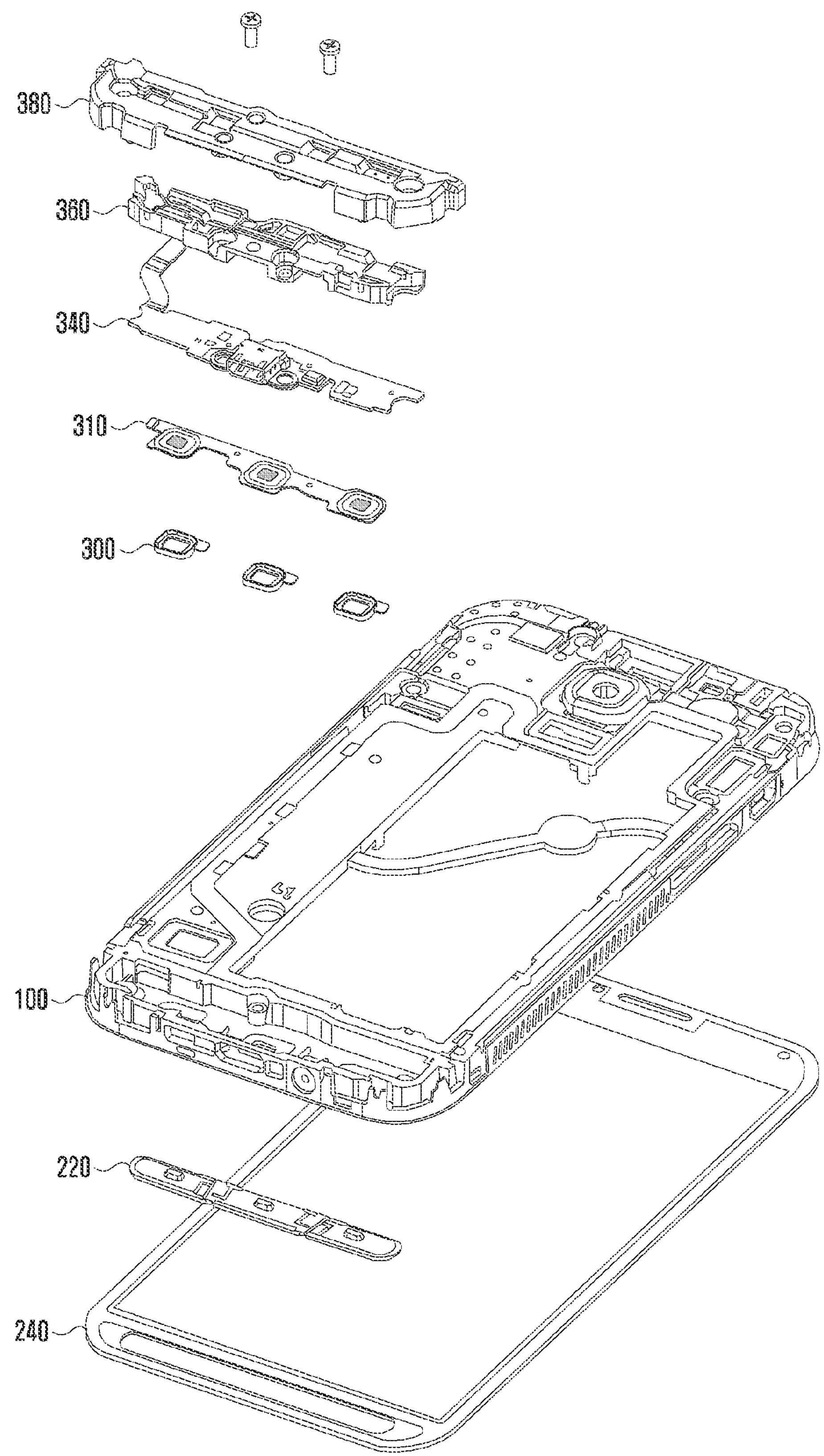
FIG. 2 is a rear exploded perspective view of a set illustrated in FIG. 1 according to an embodiment of the present disclosure.

FIG. 2 is a rear exploded perspective view of a set illustrated in FIG. 1 according to an embodiment of the present disclosure.

Referring to FIGS. 1 and 2, a set to which the waterproof key apparatus using the sealing rubber is applied, according to the embodiment of the present disclosure, has a front key structure. A key module 220 and a window 240 are attached to one side of a main case 100, and sealing rubbers 300, a universal serial bus (USB) coupling module 320, a printed circuit board (PCB) 340, a key bracket 360, and an antenna cap 380 are screw-coupled to an opposite side of the main case 100. A plurality of, for example, three sealing rubbers 300 are interposed between the main case 100 and the PCB 340 to realize waterproofing.

Figure 3:
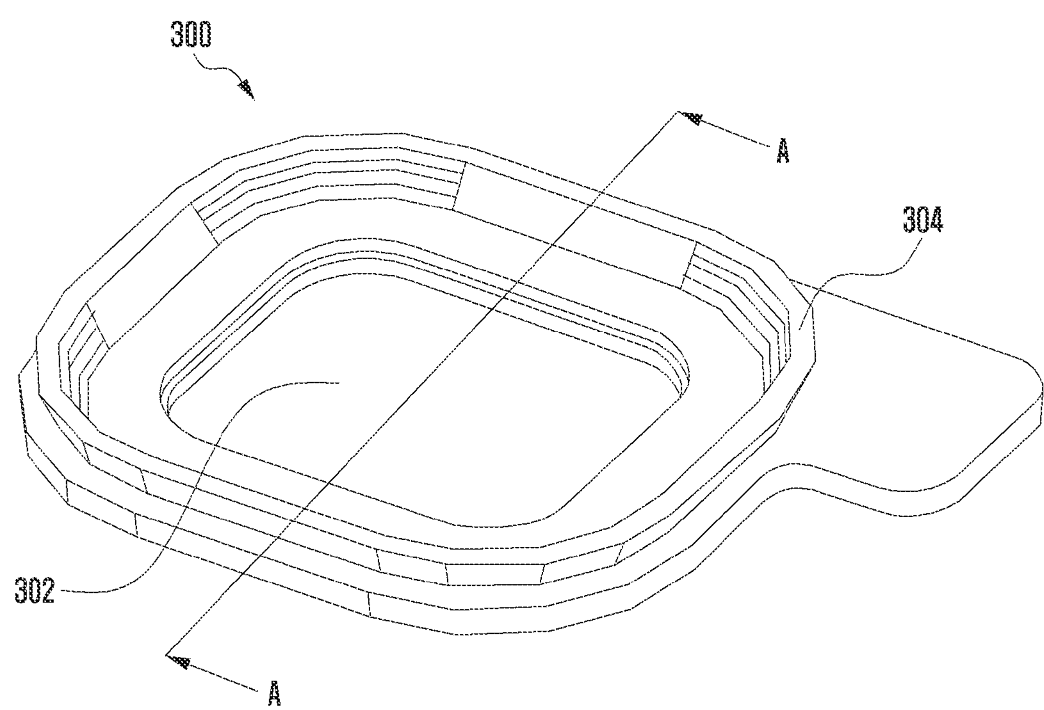
FIG. 3 is a perspective view of a sealing rubber of FIG. 1 according to an embodiment of the present disclosure.

FIG. 3 is a perspective view of a sealing rubber of FIG. 1 according to an embodiment of the present disclosure.

Figure 4:
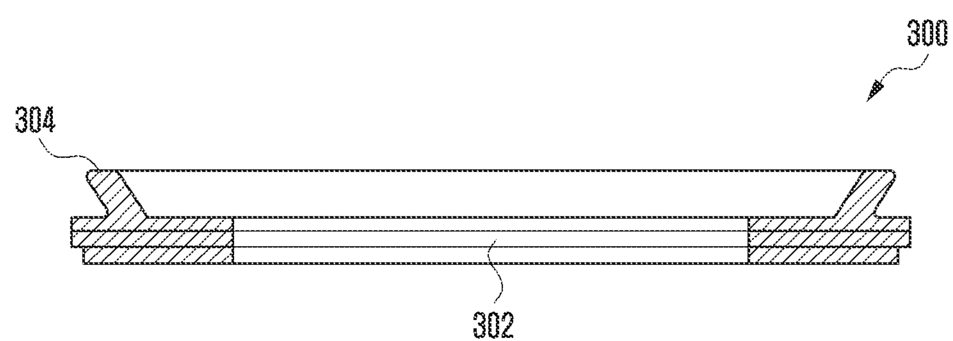
FIG. 4 is a sectional view taken along line A-A of FIG. 3 according to an embodiment of the present disclosure.

FIG. 4 is a sectional view taken along line A-A of FIG. 3 according to an embodiment of the present disclosure.

Referring to FIGS. 3 and 4, each of the sealing rubbers 300 has an annular shape surrounding the periphery of a hole of a key module 220 and may include an opening 302 and a waterproof EMBO 304 radially protruding from the periphery of the opening 302.

Figure 5:
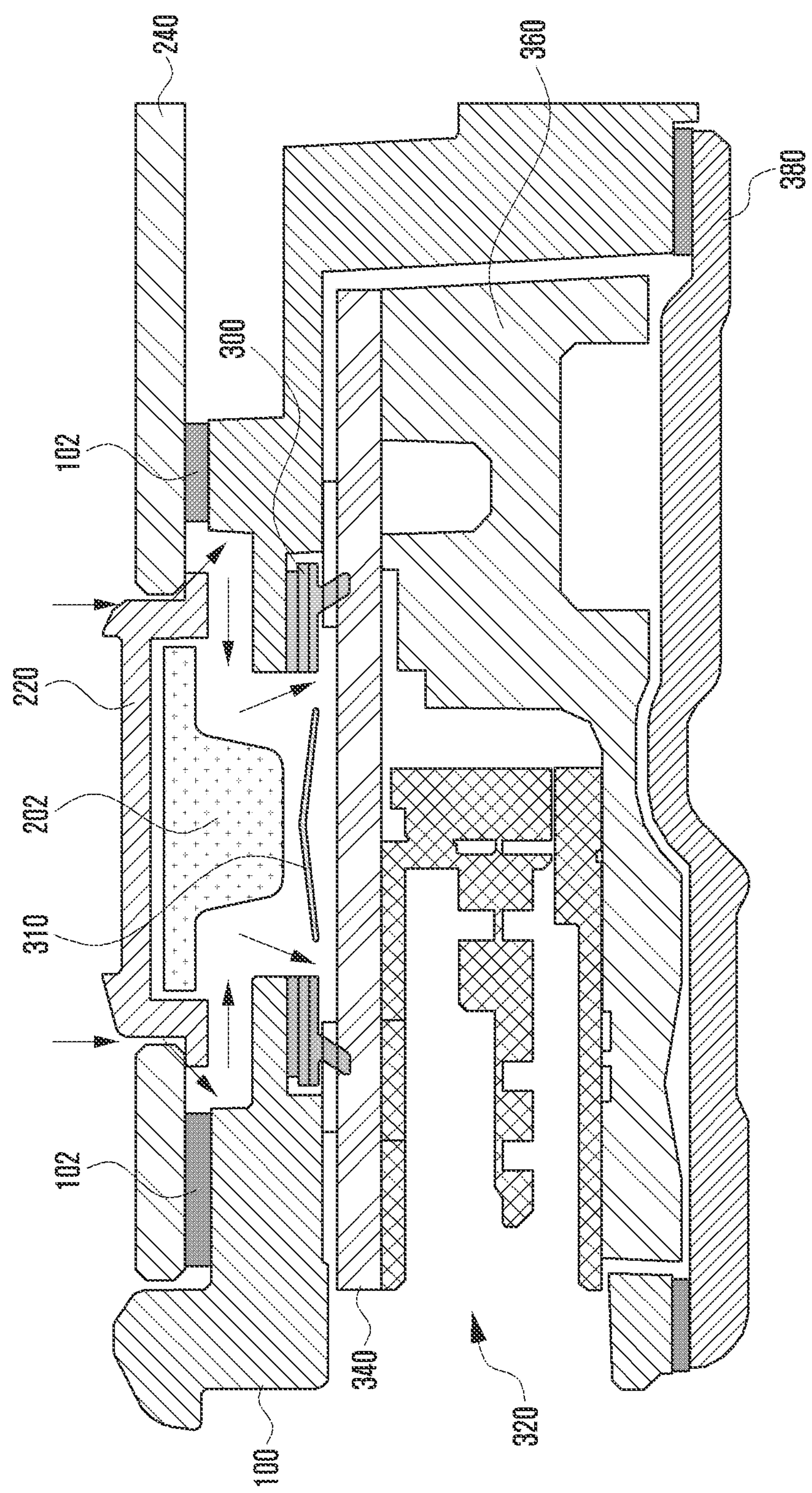
FIG. 5 is a combined sectional view of major parts, where waterproofing is implemented by a sealing rubber of FIG. 1 according to an embodiment of the present disclosure.

FIG. 5 is a sectional view of major parts, coupled to one another, for explaining a waterproof embodiment using sealing rubbers of FIG. 1 according to an embodiment of the present disclosure.

Referring to FIG. 5, the key module 220 including a key actuator 202 and the window 240 to which the key module 220 is coupled are attached to the upper portion of the main case 100 by an adhesive tape 102, and the sealing rubber 300 is interposed between the bottom of the main case 100 and the PCB 340. The waterproof EMBO 304 of the sealing rubber 300 radially overlaps the PCB 340 to prevent the infiltration of moisture into circuit components on the rear surface of the PCB 340, thereby realizing waterproofing.

The PCB 340 and the key bracket 360 on the rear surface of the PCB are fastened to each other through one or more screws (not illustrated), and the fastening force therebetween has to be able to maintain the waterproof sealing formed by the overlap between the waterproof EMBO 304 and the PCB 340.

The USB coupling module 320 to which a USB is coupled is formed on a side of the key bracket 360 on the rear surface of the PCB 340, and a dome sheet 310 may be interposed between the plurality of sealing rubbers 300 and the PCB 340.

Figure 6A:
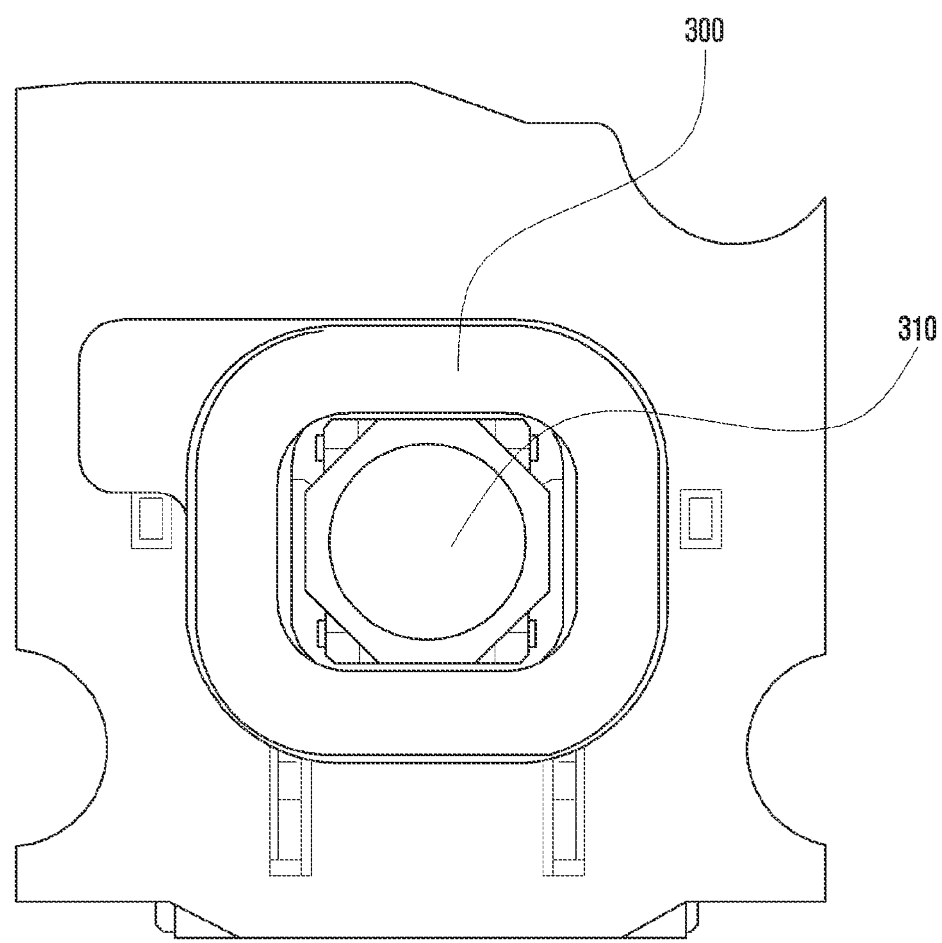
FIGS. 6A and 6B are views illustrating states in which a sealing rubber of FIG. 1 is attached, according to shapes thereof according to an embodiment of the present disclosure.
Figure 6B:
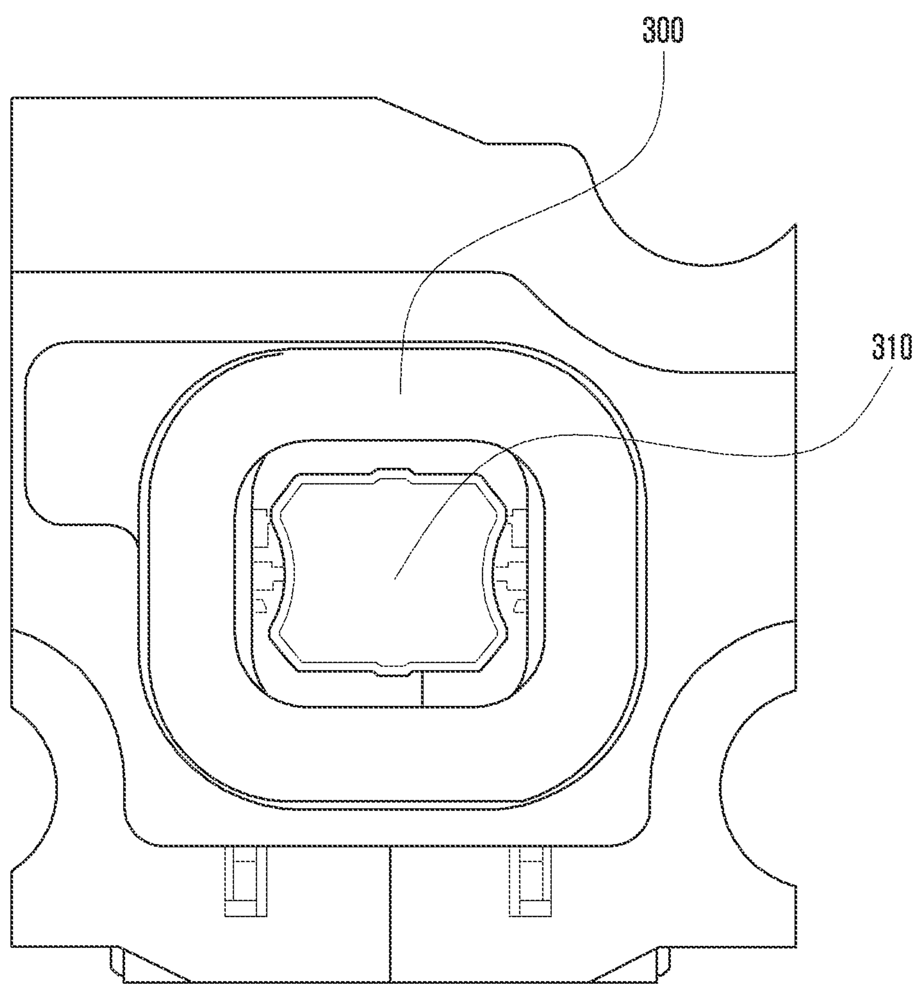

FIGS. 6A and 6B are views illustrating states in which a sealing rubber of FIG. 1 is attached, according to shapes thereof according to an embodiment of the present disclosure.

Referring to FIGS. 6A and 6B, the dome sheet 310 may be of a surface mounted diode (SMD) dome type or a dome sheet type.

Hereinafter, waterproof key apparatuses using sealing rubbers according to second to sixth embodiments of the present disclosure will be described with reference to FIGS. 7 to 13.

Figure 7:
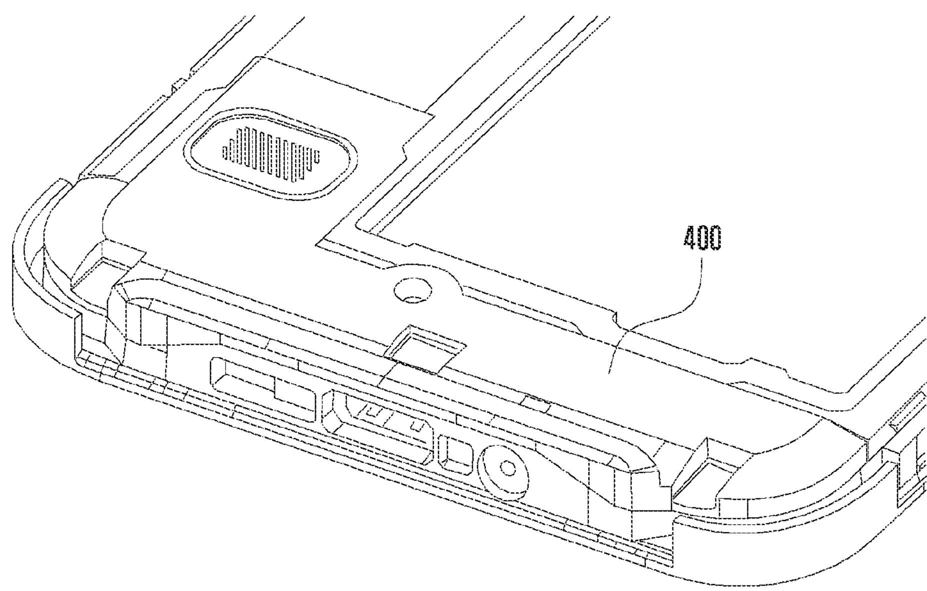
FIG. 7 illustrates a waterproof key apparatus, where
Figure 7:
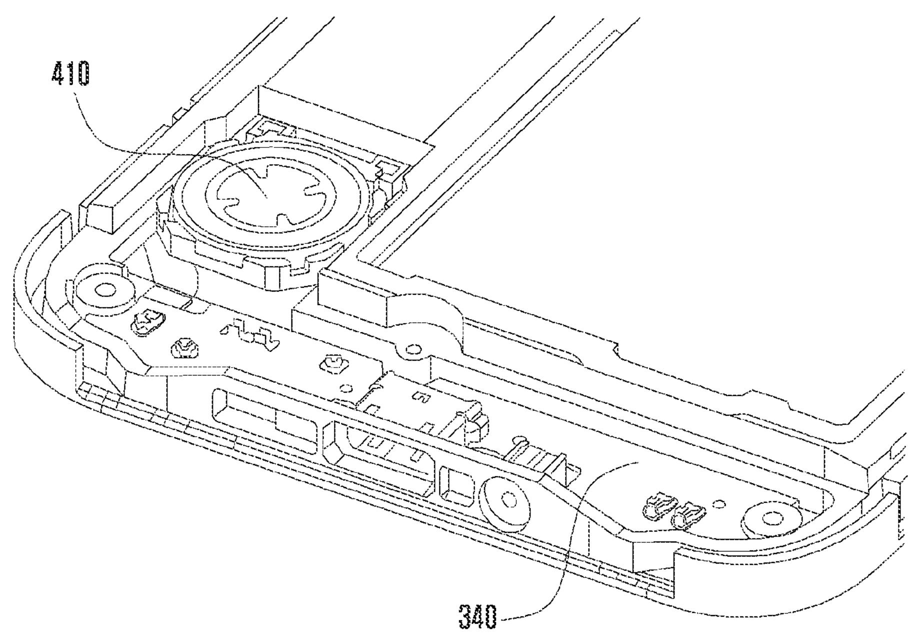

FIG. 7 illustrates a waterproof key apparatus and a room created when a rear surface of a PCB is assembled may be used as a resonance box according to an embodiment of the present disclosure.

Referring to FIG. 7, a set having a front key structure may include the PCB 340 of the waterproof key apparatus using the sealing rubber according to the embodiment of the present disclosure described above. A speaker 410 may be mounted on the rear surface of the PCB 340, and then a PCB rear-side assembly 400 may be assembled.

At this time, a sealed room is formed between the rear surface of the PCB 340 and the PCB rear-side assembly 400. Such a room is sealed by the sealing rubber 300 and thus may be used as an enclosure like the resonance box of the speaker 410 without a separate additional structure.

Figure 8:
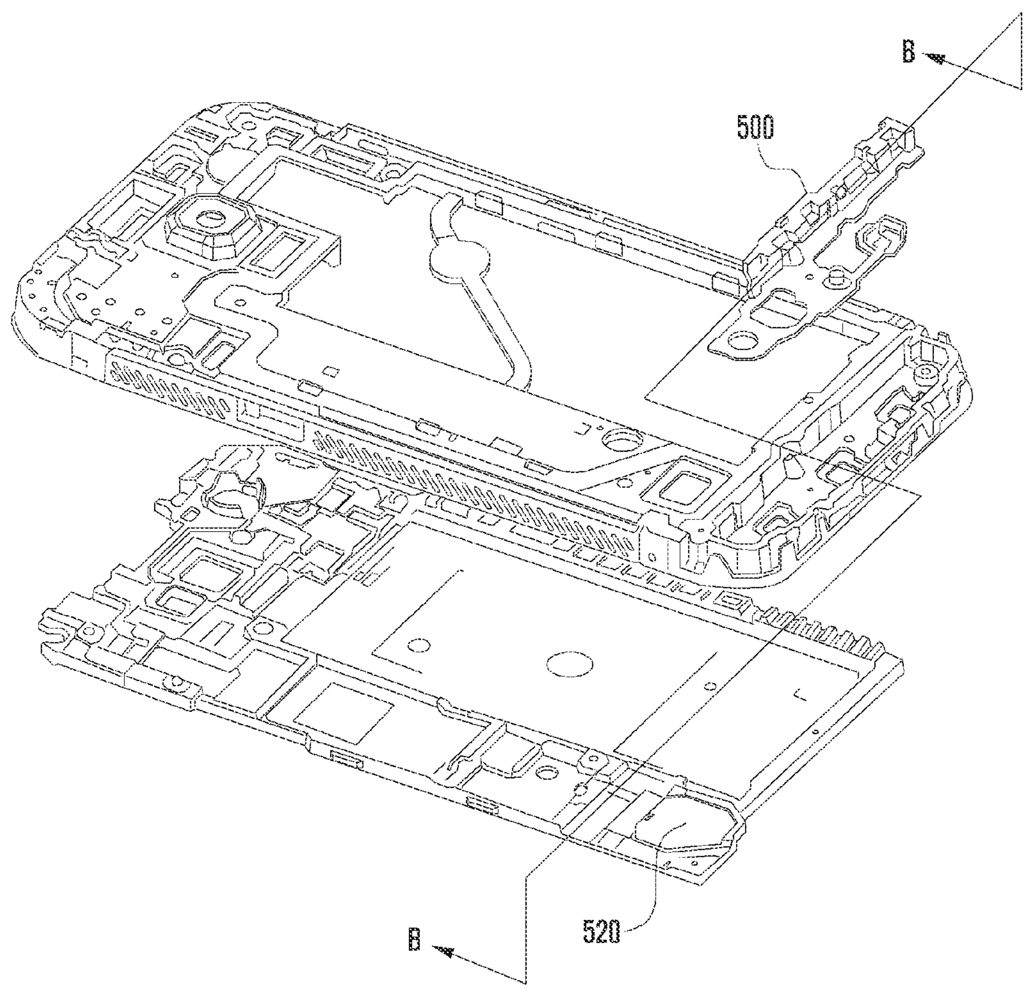
FIG. 8 illustrates a waterproof key apparatus, where
Figure 9:
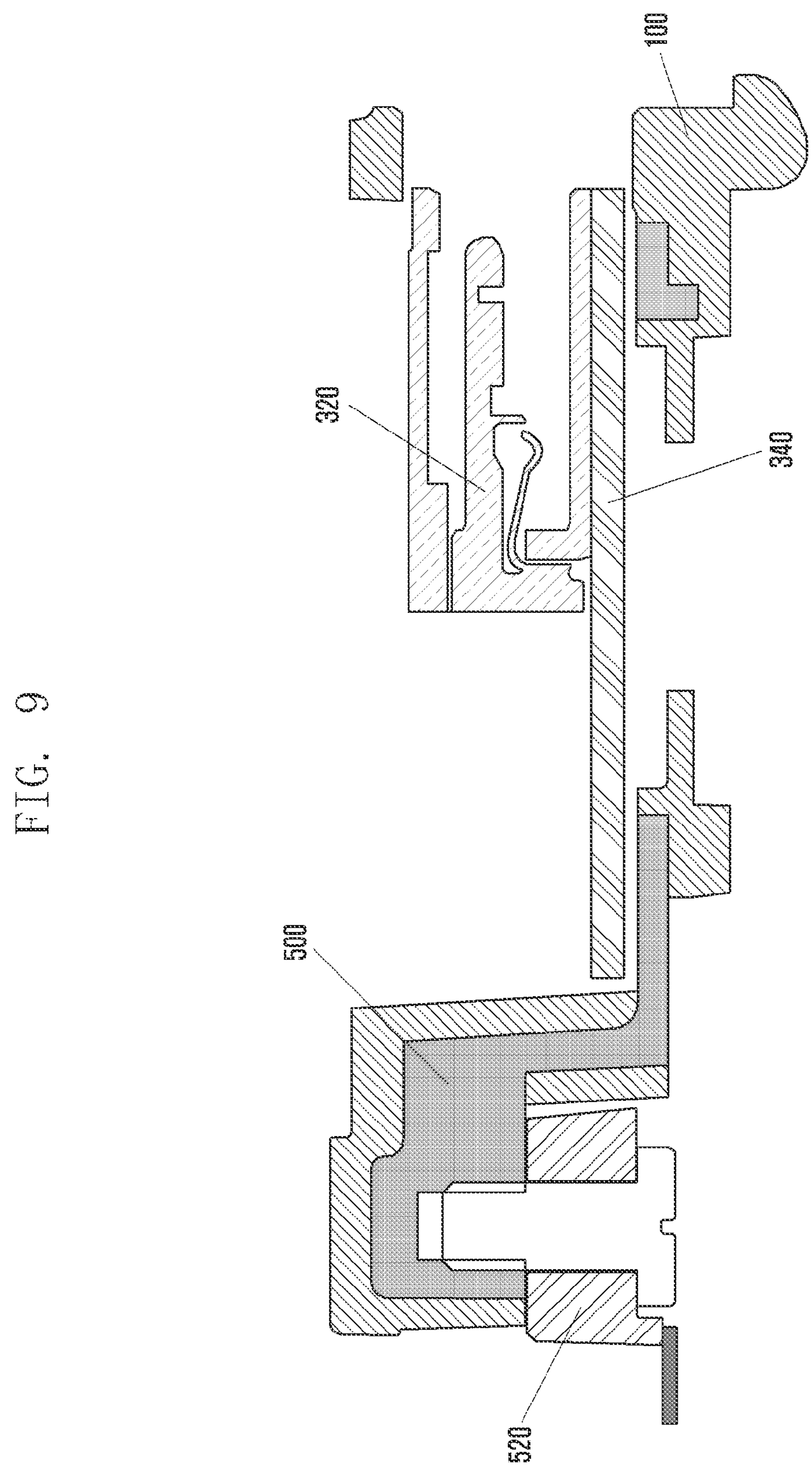
FIG. 9 is a combined sectional view of FIG. 8 according to an embodiment of the present disclosure.

FIGS. 8 and 9 illustrate a waterproof key apparatus which may implement a metal device antenna (MDA) according to an embodiment of the present disclosure.

Referring to FIGS. 8 and 9, a rear bracket 500 is insert-molded to the main case 100 of a set having a front key structure, and a liquid crystal display (LCD) bracket 520 and the rear bracket 500 are electrically connected to each other, whereby a MDA may be implemented with the LCD bracket 520 having no separate additional metal structure for electrical conduction.

Figure 10A:
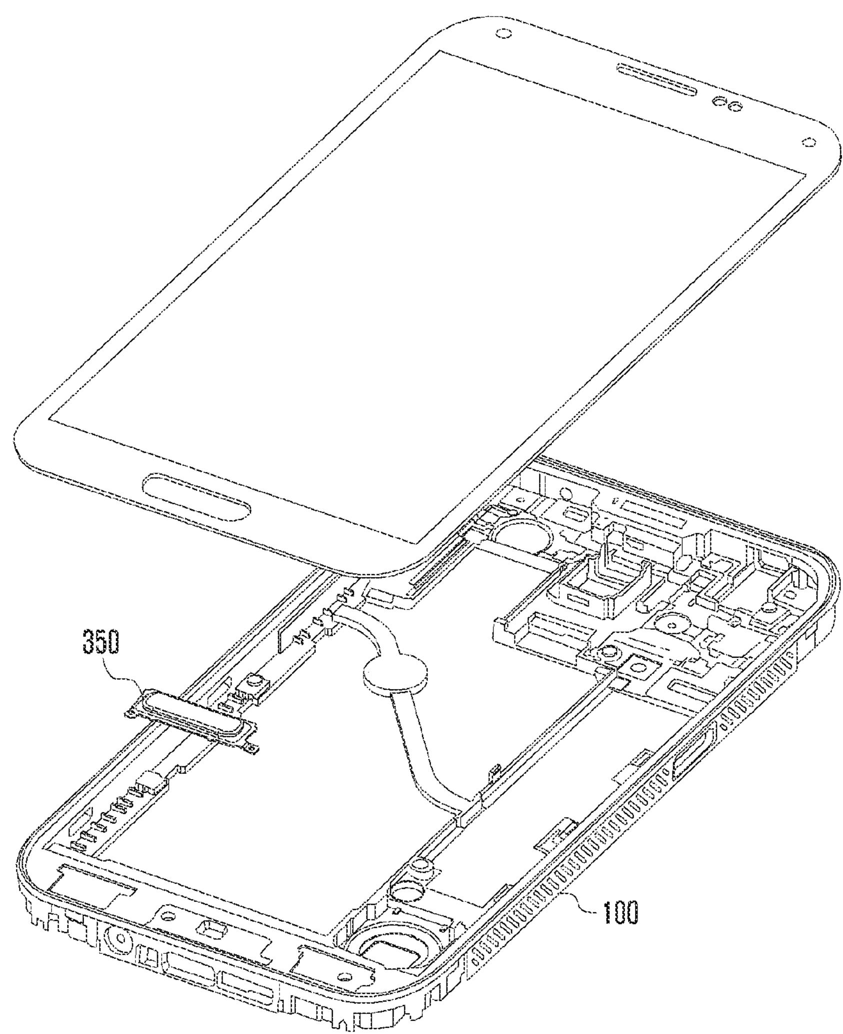
FIGS. 10A and 10B illustrate a waterproof key apparatus, where
Figure 10A:
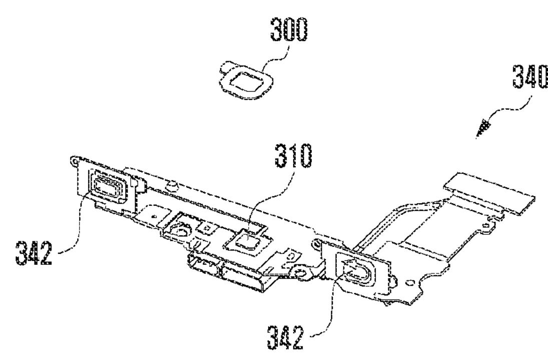
Figure 10B:
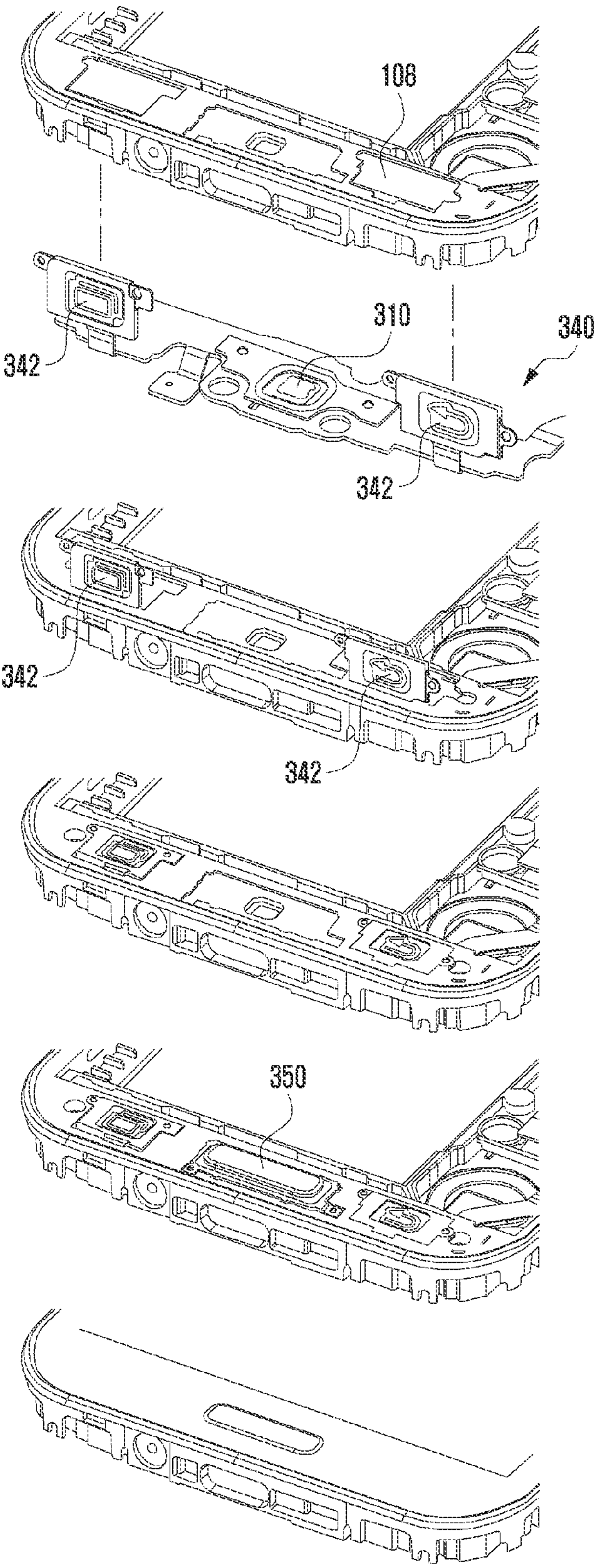

FIGS. 10A and 10B illustrate a waterproof key apparatus which may realize a waterproof structure for one button key and left and right touch keys according to an embodiment of the present disclosure.

Referring to FIG. 10A, in cases where the waterproof key apparatus, according to the embodiment of the present disclosure described above, in which the sealing rubbers 300 are attached between the bottom of the main case 100 and the PCB 340, is applied to a set having a front key structure, the waterproof EMBOs 304 of the sealing rubbers 300 may overlap the PCB 340 while spreading radially.

In this case, the dome sheet 310 is positioned in the center of the PCB 340 such that a general home key is coupled as a button key, and flexible PCBs (FPCBs) 342 for a touch key may be integrally formed with the PCB 340, on left and right sides of the dome sheet 310.

Referring to FIG. 10B, the FPCBs 342 for a touch key pass through the injection holes 108 of the main case 100, protrude upward from the main case 100, and then are bent, and a general shape of a home key 350 is assembled as a button key on the upper portion of the dome sheet 310, thereby realizing a water proof structure for the central button key and the left and right touch keys.

Figure 11:
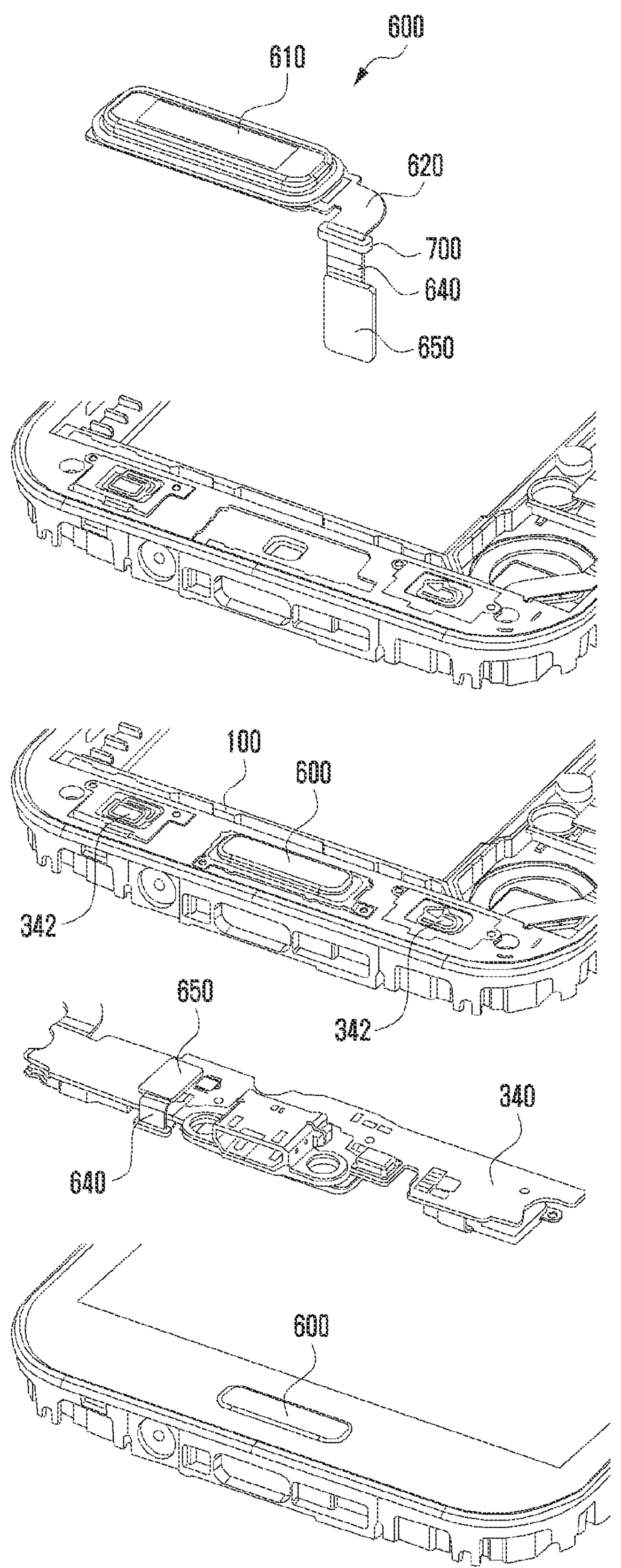
FIG. 11 illustrates a waterproof key apparatus, where

FIG. 11 illustrates a waterproof key apparatus which may realize a waterproof structure for one button key to which a sensor is attached and left and right touch keys according to an embodiment of the present disclosure.

Referring to FIG. 11, the sensor-attached button key is coupled to the center of the PCB 340. Accordingly, the following description will be focused on a difference therebetween.

A sensor-attached button key 600 includes a button 610, a horizontal extending piece 620 that horizontally extends from a side of the button 610, a bent piece 640 that is vertically bent downward from the horizontal extending piece 620, and a sensor 650 attached to the bent piece 640.

The bent piece 640 may include a sealing rubber 700 that is integrally attached to the periphery thereof.

The bent piece 640 to which the sensor 650 is attached passes through an injection hole (not illustrated) of the main case 100 and protrudes downward from the main case 100, and the protruding portion is bent again toward the rear surface of the PCB 340, whereby the sensor 650 may be brought close to the rear surface of the PCB 340.

At this time, the sealing rubber 700 integrally attached to the periphery of the bent piece 640 seals the injection hole of the main case 100, thereby realizing waterproofing.

Figure 12:
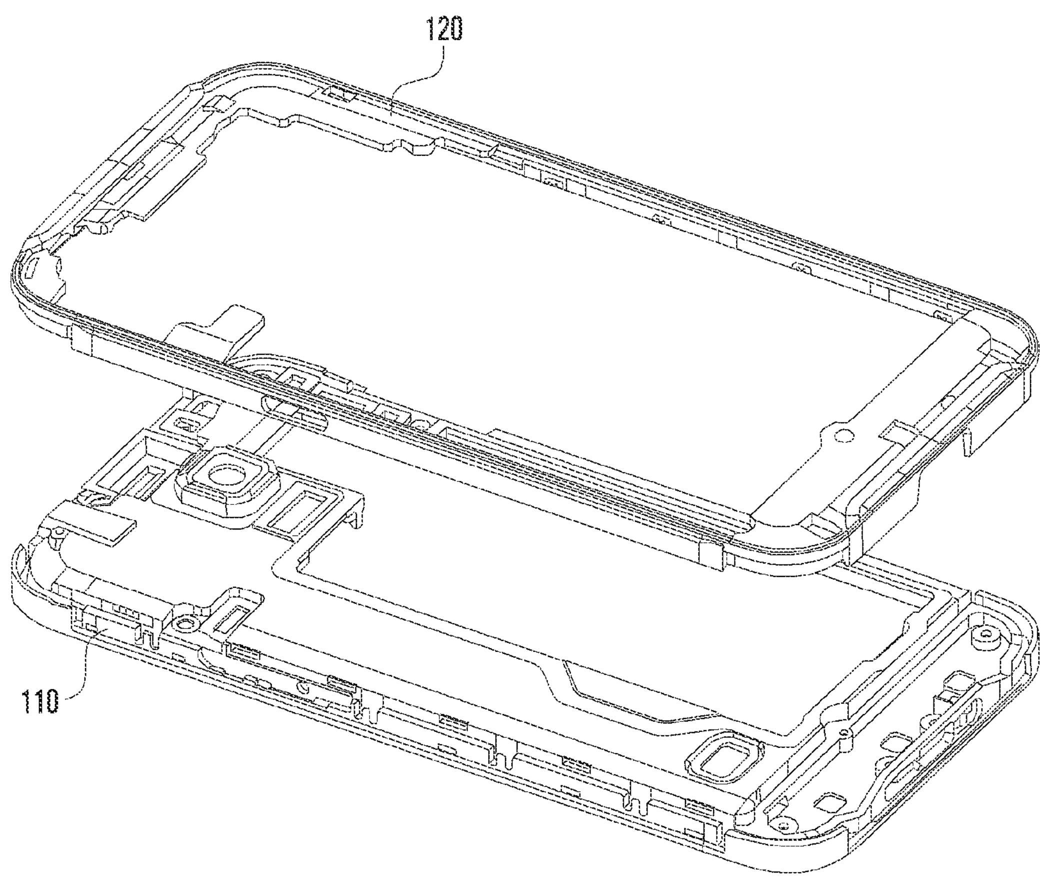
FIG. 12 illustrates a waterproof key apparatus, where
Figure 13:
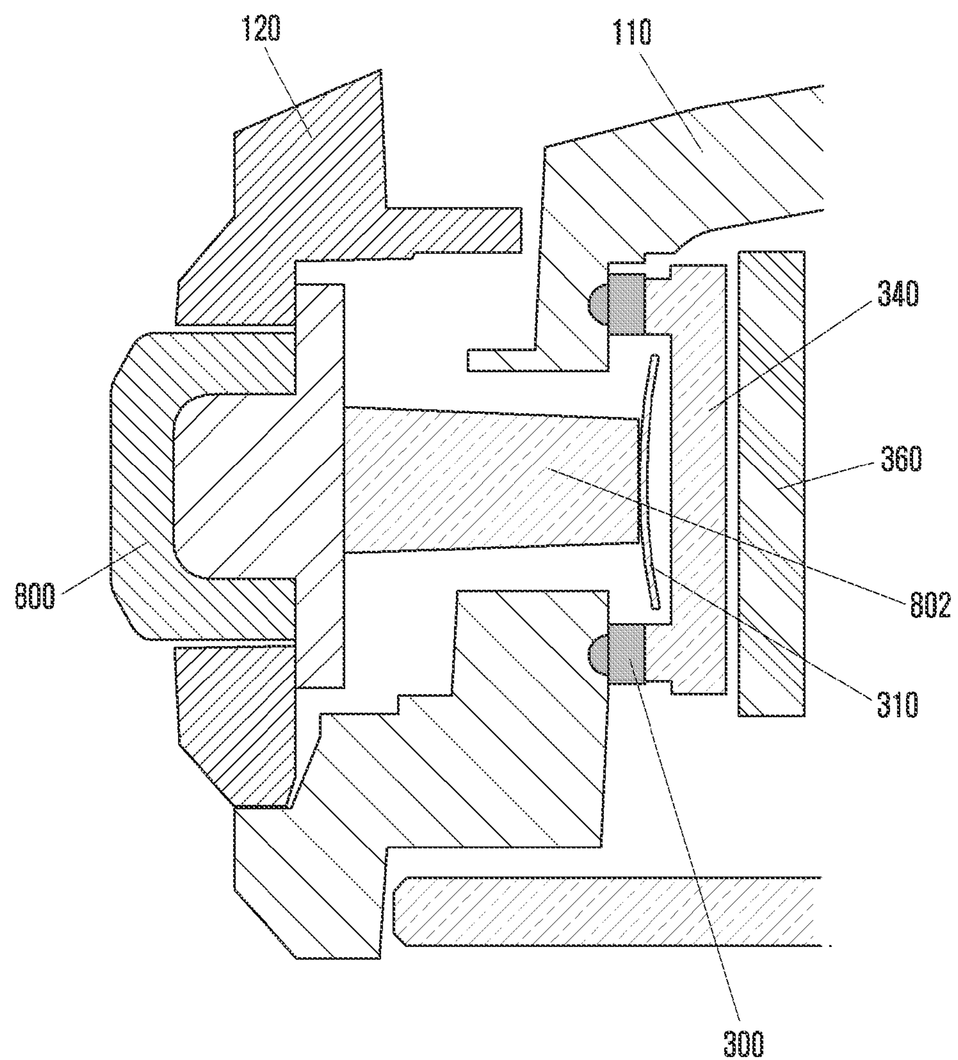
FIG. 13 is a combined sectional view of major parts of FIG. 12 according to an embodiment of the present disclosure.

FIGS. 12 and 13 illustrate a waterproof key apparatus which may realize a waterproof structure for a side key according to an embodiment of the present disclosure.

Referring to FIGS. 12 and 13, a side key module 800 may be attached between a first main case 110 and a second main case 120.

The side key module 800 includes a key actuator 802 and is coupled to the first main case 110.

The sealing rubber 300 may be attached between the lower portion of the second main case 120 and the PCB 340 having the dome sheet 310.

Likewise to the first embodiment described above, the waterproof EMBO (not illustrated) of the sealing rubber 300 overlaps the second main case 120 while spreading radially to prevent the infiltration of moisture into circuit components on the rear surface of the PCB 340, thereby realizing waterproofing. The key bracket 360 is fastened to the rear surface of the PCB 340 through a plurality of screws, and the fastening force therebetween has to be able to maintain the waterproof sealing formed by the overlap between the waterproof EMBO and the second main case 120.

After the assembly of the components as described above, final waterproofing may be completed by a waterproof cap (not illustrated).

As used in the present disclosure, the expression "include" or "may include" or "can include" refers to the existence of a corresponding function, operation, or constituent element, and does not limit one or more additional functions, operations, or constituent elements. Further, as used in the present disclosure, the term such as "include" or "have" may be construed to denote a certain characteristic, number, operation, constituent element, component or a combination thereof, but may not be construed to exclude the existence of or a possibility of addition of one or more other characteristics, numbers, operations, constituent elements, components or combinations thereof.

As used in the present disclosure, the expression "and/or" includes any or all combinations of words enumerated together. For example, the expression "A or B" or "at least one of A and B" may include A, may include B, or may include both A and B.

While expressions including ordinal numbers, such as "first" and "second", as used in the present disclosure may modify various constituent elements, such constituent elements are not limited by the above expressions. For example, the above expressions do not limit the sequence and/or importance of the corresponding constituent elements. The above expressions may be used merely for the purpose of distinguishing a constituent element from other constituent elements. For example, a first user device and a second user device indicate different user devices although both are user devices. For example, a first constituent element may be termed a second constituent element, and likewise a second constituent element may also be termed a first constituent element without departing from the scope of the present disclosure.

When a component is referred to as being "connected" or "accessed" to any other component, it should be understood that the component may be directly connected or accessed to the other component, but another new component may also be interposed between them. Contrarily, when a component is referred to as being "directly connected" or "directly accessed" to any other component, it should be understood that there is no new component between the component and the other component.

The terms as used in various embodiments of the present disclosure are merely for the purpose of describing particular embodiments and are not intended to limit the present disclosure.

Unless defined otherwise, all terms used herein, including technical terms and scientific terms, have the same meaning as commonly understood by a person of ordinary skill in the art to which the present disclosure pertains. Such terms as those defined in a generally used dictionary are to be interpreted to have the meanings equal to the contextual meanings in the relevant field of art, and are not to be interpreted to have ideal or excessively formal meanings unless clearly defined in the present disclosure.

Herein, the term "color-blind" is used to refer to a person with any color-vision-deficiency. Herein, "correcting" a color-blind condition or like phrase refers to improving the ability of the person to see a colored object or to distinguish between objects of different colors.

It should be understood that when an element (e.g., first element) is referred to as being (operatively or communicatively) "connected," or "coupled," to another element (e.g., second element), it may be directly connected or coupled directly to the other element or any other element (e.g., third element) may be interposer between them. In contrast, it may be understood that when an element (e.g., first element) is referred to as being "directly connected," or "directly coupled" to another element (second element), there are no element (e.g., third element) interposed between them.

The expression "configured to" used in the present disclosure may be exchanged with, for example, "suitable for", "having the capacity to", "designed to", "adapted to", "made to", or "capable of" according to the situation. The term "configured to" may not necessarily imply "specifically designed to" in hardware. Alternatively, in some situations, the expression "device configured to" may mean that the device, together with other devices or components, "is able to". For example, the phrase "processor adapted (or configured) to perform A, B, and C" may mean a dedicated processor (e.g. embedded processor) only for performing the corresponding operations or a generic-purpose processor (e.g., central processing unit (CPU) or application processor (AP)) that may perform the corresponding operations by executing one or more software programs stored in a memory device.

In some cases, even the term defined in the present disclosure should not be interpreted to exclude embodiments of the present disclosure.

In this disclosure, an electronic device may be a device that involves a communication function. For example, an electronic device may be a smart phone, a tablet personal computer (PC), a mobile phone, a video phone, an e-book reader, a desktop PC, a laptop PC, a netbook computer, a personal digital assistant (PDA), a portable multimedia player (PMP), a Moving Picture Experts Group phase 1 or phase 2 (MPEG-1 or MPEG-2) audio layer 3 (MP3) player, a portable medical device, a digital camera, or a wearable device (e.g., a head-mounted device (HMD) such as electronic glasses, electronic clothes, an electronic bracelet, an electronic necklace, electronic tattoos, an electronic appcessory, or a smart watch).

According to some embodiments, an electronic device may be a smart home appliance that involves a communication function. For example, an electronic device may be a television (TV), a digital video disc (DVD) player, audio equipment, a refrigerator, an air conditioner, a vacuum cleaner, an oven, a microwave, a washing machine, an air cleaner, a set-top box, a TV box (e.g., Samsung HomeSync™, Apple TV™, Google TV™, and the like), a game console, an electronic dictionary, an electronic key, a camcorder, or an electronic picture frame.

According to some embodiments, an electronic device may be a medical device (e.g., magnetic resonance angiography (MRA), magnetic resonance imaging (MRI), computed tomography (CT), ultrasonography, and the like), a navigation device, a global positioning system (GPS) receiver, an event data recorder (EDR), a flight data recorder (FDR), a car infotainment device, electronic equipment for ship (e.g., a marine navigation system, a gyrocompass, and the like), avionics, security equipment, head unit for vehicles, an industrial or home robot, an automatic teller machine of financial institutions, point of sales of stores, or interne of things (e.g., a light bulb, various sensors, electricity or gas meter, a sprinkler, a fire alarm, a thermostat, a street lamp, a toaster, exercise equipment, a hot-water tank, a heater, a boiler, and the like)

According to some embodiments, an electronic device may be furniture or part of a building or construction having a communication function, an electronic board, an electronic signature receiving device, a projector, or various measuring instruments (e.g., a water meter, an electric meter, a gas meter, a wave meter, and the like). An electronic device disclosed herein may be one of the above-mentioned devices or any combination thereof. Further, the electronic device according to the present disclosure may be a flexible device. It is noted that the above-mentioned electronic devices are not to be considered as a limitation of this disclosure.

An electronic device according to various embodiments of the present disclosure will be discussed with reference to the accompanying drawings. The term "a user" as used in various embodiments may refer to any person who uses an electronic device or any other device (e.g., an artificial intelligence electronic device) using an electronic device.

Figure 14:
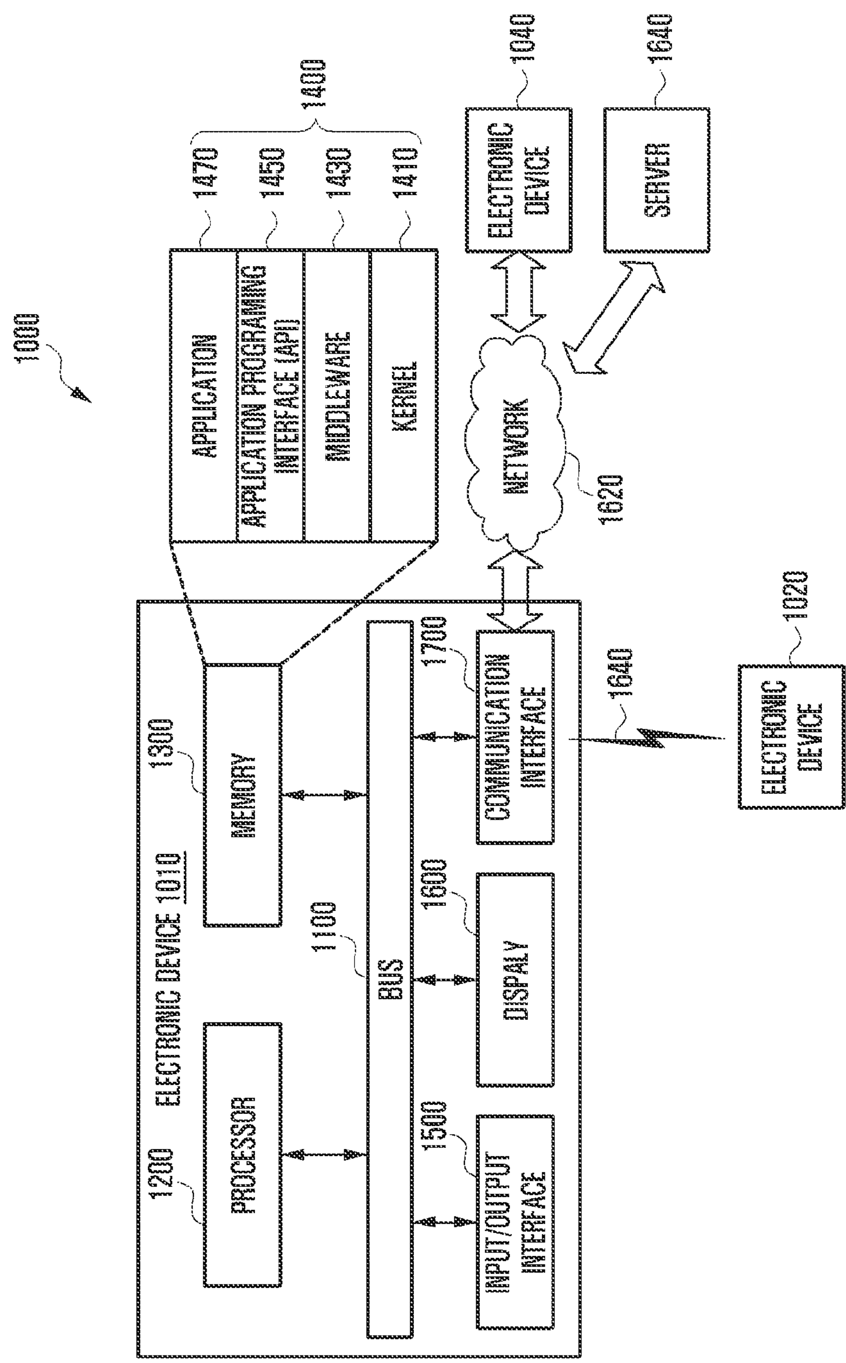
FIG. 14 is a block diagram illustrating a network environment including therein an electronic device according to various embodiments of the present disclosure.

FIG. 14 is a block diagram illustrating a network environment including therein an electronic device according to an embodiment of the present disclosure.

Referring to FIG. 14, an electronic device 1010 of a network environment 1000 may include, but is not limited to, a bus 1100, a processor 1200, a memory 1300, an input/output interface 1500, a display 1600, and a communication interface 1700.

The bus 1100 may be a circuit designed for connecting the above-discussed elements 1100, 1200, 1300, 1400, 1500, 1600 and 1700 and communicating data (e.g., a control message) between such elements.

The processor 1200 may include one or more of a CPU, an AP, and a communication processor (CP). For example, the processor 1200 may carry out operations or data processing related to control and/or communication of at least one other component of the electronic device 1010.

The memory 1300 may include a volatile memory and/or a non-volatile memory. The memory 1300 may store, for example, commands or data related to at least one other component of the electronic device 1010. According to an embodiment, the memory 1300 may store software and/or a program 1400.

The memory 1300 may store therein software and/or program 1400. The program 1400 may include a kernel 1410, a middleware 1430, an application programming interface (API) 1450, and an application 1470. At least some of the kernel 1410, the middleware 1430, and the API 1450 may be referred to as an operating system (OS).

The kernel 1410 may control or manage system resources (e.g., the bus 1100, the processor 1200, or the memory 1300, and the like) used for performing operations or functions of the other programming modules, e.g., the middleware 1430, the API 1450, or the application 1470. Additionally, the kernel 1410 may offer an interface that allows the middleware 1430, the API 1450 or the application 1470 to access, control or manage individual elements of the electronic device 1010.

The middleware 1430 may perform intermediation by which the API 1450 or the application 1470 communicates with the kernel 131 to transmit or receive data. Additionally, in connection with task requests received from the applications 1470, the middleware 1430 may perform a control (e.g., scheduling or load balancing) for the task request by using technique such as assigning the priority for using a system resource of the electronic device 1010 (e.g., the bus 1100, the processor 1200, or the memory 1300, and the like) to at least one of the applications 1470.

The API 1450, which is an interface for allowing the application 1470 to control a function provided by the kernel 1410 or the middleware 1430, may include, for example, at least one interface or function (e.g., a command) for a file control, a window control, an image processing, a text control, and the like.

The input/output interface 1500 may deliver commands or data, entered by a user through an input/output unit (e.g., a sensor, a keyboard, or a touch screen), to the processor 1200, the memory 1300, or the communication interface 1700 via the bus 1100. For example, the input/output interface 1500 may offer data about a user's touch, entered through the touch screen, to the processor 1200. Also, through the input/output unit (e.g., a speaker or a display), the input/output interface 1500 may output commands or data, received from the processor 1200, the memory 1300, or the communication interface 1700 via the bus 1100. For example, the input/output interface 1500 may output voice data, processed through the processor 1200, to a user through the speaker.

The display 1600 may include, for example, an LCD, a light emitting diode (LED) display, an organic LED (OLED) display, a micro electro mechanical system (MEMS) display, or an electronic paper display. The display 1600 may display thereon various types of information (e.g., multimedia data, text data, image, video, icon, or symbol, and the like) to a user. The display 1600 may include a touch screen, and may receive, for example, a touch, gesture, proximity, or hovering input by using an electronic pen or a part of the user's body.

The communication interface 1700 may perform a communication between the electronic device 1010 and any external electronic device (e.g., the electronic device 1040 of the server 1060). For example, the communication interface 1700 may communicate with any external device by being connected with a network 1620 through a wired or wireless communication.

A wireless communication may include, but not limited to, at least one of Wi-Fi, Bluetooth (BT), near field communication (NFC), GPS, or a cellular communication (e.g., long-term evolution (LTE), LTE-advanced (LTE-A), code division multiple access (CDMA), wideband CDMA (WCDMA), universal mobile telecommunications system (UMTS), wireless broadband (WiBro), or global system for mobile communications (GSM), and the like). Further, the wireless communication may include a NFC 1640. The NFC 1640 may include at least one of Wi-Fi, BT, NFC, or GPS.

A wired communication may include, but is not limited to, at least one of USB, high definition multimedia interface (HDMI), recommended standard 232 (RS-232), or plain old telephone service (POTS). According to an embodiment, the network 1620 may be a communication network, which may include at least one of a computer network such as a local area network (LAN) or a wide area network (WAN), an internet, or a telephone network.

Each of the first and second external electronic devices 1020 and 1040 may be a device which is the same as or different from the electronic device 1010. According to an embodiment, the server 1060 may include a group of one or more servers.

According to various embodiments, all or some of the operations performed by the electronic device 1010 may be performed by another electronic device or a plurality of electronic devices (e.g., the electronic device 1020, 1040 or server 1060). According to an embodiment, when the electronic device 1010 should perform some functions or services automatically or by a request, the electronic device 1010 may make a request for performing at least some functions related to the functions or services to another device (e.g., the electronic device 1020 or 1040, or the server 1060) instead of performing the functions or services by itself or additionally. The other electronic device (e.g., the electronic device 1020 or 1040, or the server 1060) may carry out the requested functions or the additional functions and provide results thereof to the electronic device 1010. The electronic device 1010 may provide requested functions or services based on the received results or after additionally processing the received results. To this end, for example, cloud computing, distributed computing, or client-server computing technology may be used.

Figure 15:
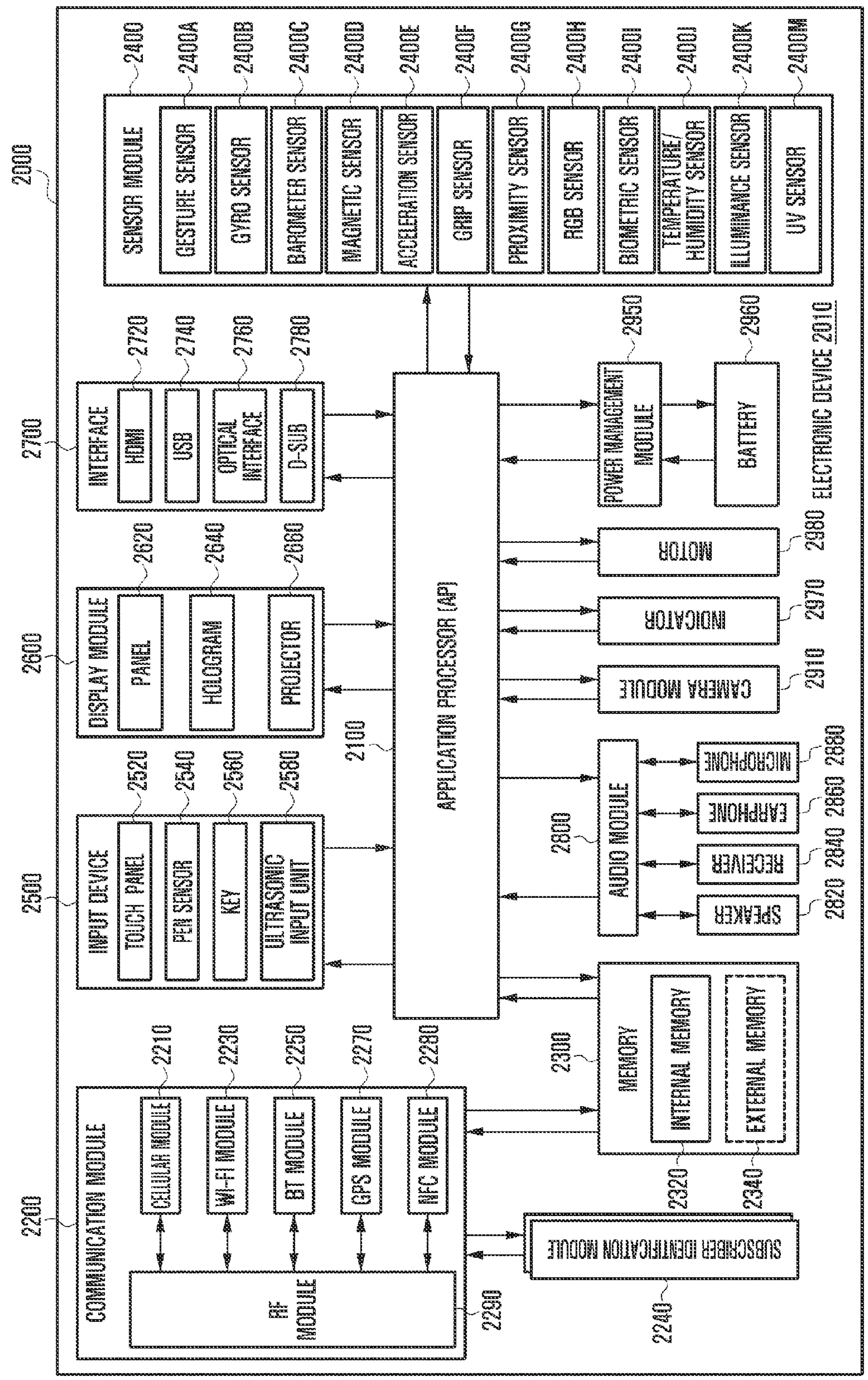
FIG. 15 is a block diagram illustrating an electronic device according to various embodiments of the present disclosure.

FIG. 15 is a block diagram illustrating an electronic device according to an embodiment of the present disclosure.

Referring to FIG. 15, an electronic device 2010 may form, for example, the whole or part of the electronic device 1010 shown in FIG. 14. Electronic device 2010 may include at least one AP 2100, a communication module 2200, a subscriber identification module (SIM) 2240, a memory 2300, a sensor module 2400, an input unit 2500, a display 2600, an interface 2700, an audio module 2800, a camera module 2910, a power management module 2950, a battery 2960, an indicator 2970, and a motor 2980.

The AP 2100 may drive an operating system or applications, control a plurality of hardware or software components connected thereto, and also perform processing and operation for various data including multimedia data. The AP 2100 may be formed of system-on-chip (SoC), for example. According to an embodiment, the AP 2100 may further include a graphics processing unit (GPU) and/or an image signal processor (not shown). The processor 2100 may include at least some of the components (e.g., a cellular module 2210) illustrated in FIG. 15. The processor 2100 may load instructions or data received from at least one other component (e.g., a non-volatile memory) in a volatile memory, process the loaded instructions or data, and may store various types of data in a non-volatile memory.

The communication module 2200 (e.g., the communication interface 1700 of FIG. 14) may perform data communication with any other electronic device (e.g., the electronic device 1040 or the server 1060) connected to the electronic device 2010 (e.g., the electronic device 1010) through the network. According to an embodiment, the communication module 2200 may include therein a cellular module 2210, a Wi-Fi module 2230, a BT module 2250, a GPS module 2270, an NFC module 2280, and a radio frequency (RF) module 2290.

The cellular module 2210 may support a voice call, a video call, a message service, an internet service, and the like through a communication network (e.g., LTE, LTE-A, CDMA, WCDMA, UMTS, WiBro, or GSM, and the like). Additionally, the cellular module 2210 may perform identification and authentication of the electronic device in the communication network, using the SIM 2240. According to an embodiment, the cellular module 2210 may perform at least part of functions the AP 2100 may provide. For example, the cellular module 2210 may perform at least part of a multimedia control function.

Each of the Wi-Fi module 2230, the BT module 2250, the GPS module 2270 and the NFC module 2280 may include a processor for processing data transmitted or received therethrough. Although FIG. 15 shows the cellular module 2210, the Wi-Fi module 2230, the BT module 2250, the GPS module 2270 and the NFC module 2280 as different blocks, at least part of them may be contained in a single integrated circuit (IC) chip or a single IC package in an embodiment.

The RF module 2290 may transmit and receive data, e.g., RF signals or any other electric signals. Although not shown, the RF module 2290 may include a transceiver, a power amp module (PAM), a frequency filter, a low noise amplifier (LNA), and the like. Also, the RF module 2290 may include any component, e.g., a wire or a conductor, for transmission of electromagnetic waves in a free air space. Although FIG. 15 shows that the cellular module 2210, the Wi-Fi module 2230, the BT module 2250, the GPS module 2270 and the NFC module 2280 share the RF module 2290, at least one of them may perform transmission and reception of RF signals through a separate RF module in an embodiment.

The SIM 2240 may be a specific card formed of SIM and may be inserted into a slot formed at a certain place of the electronic device. The SIM may contain therein an IC card identifier (ICCID) or an international mobile subscriber identity (IMSI).

The memory 2300 (e.g., the memory 1300) may include an internal memory 2320 and an external memory 2340. The internal memory 2320 may include, for example, at least one of a volatile memory (e.g., dynamic random access memory (DRAM), static RAM (SRAM), synchronous DRAM (SDRAM), and the like) or a nonvolatile memory (e.g., one time programmable read-only memory (OTPROM), programmable ROM (PROM), erasable and programmable ROM (EPROM), electrically erasable and programmable ROM (EEPROM), mask ROM, flash ROM, not and (NAND) flash memory, not or (NOR) flash memory, or hard drive, and the like).

According to an embodiment, the internal memory 2320 may have the form of a solid state drive (SSD). The external memory 2340 may include a flash drive, e.g., compact flash (CF), secure digital (SD), micro-SD, mini-SD, extreme digital (xD), multimediacard (MMC), memory stick, and the like. The external memory 2340 may be functionally connected to the electronic device 2010 through various interfaces.

The sensor module 2400 may measure physical quantity or sense an operating status of the electronic device 2010, and then convert measured or sensed information into electric signals. The sensor module 2400 may include, for example, at least one of a gesture sensor 2400A, a gyro sensor 2400B, an atmospheric sensor 2400C, a magnetic sensor 2400D, an acceleration sensor 2400E, a grip sensor 2400F, a proximity sensor 2400G, a color sensor 2400H (e.g., red, green, blue (RGB) sensor), a biometric sensor 2400I, a temperature-humidity sensor 2400J, an illumination sensor 2400K, and a ultraviolet (UV) sensor 2400M. Additionally or alternatively, the sensor module 2400 may include, e.g., an E-nose sensor (not shown), an electromyography (EMG) sensor (not shown), an electroencephalogram (EEG) sensor (not shown), an electrocardiogram (ECG) sensor (not shown), an infrared (IR) sensor (not shown), an iris scan sensor (not shown), or a finger scan sensor (not shown). Also, the sensor module 2400 may include a control circuit for controlling one or more sensors equipped therein. In some embodiments, the electronic device 2010 may further include a processor configured to control the sensor module 2400 as a part of or separately from the processor 2100, and may control the sensor module 2400 while the AP 2100 is in a sleep state.

The input unit 2500 may include a touch panel 2520, a digital pen sensor 2540, a key 2560, or an ultrasonic input unit 2580. The touch panel 2520 may recognize a touch input in a manner of capacitive type, resistive type, infrared type, or ultrasonic type. Also, the touch panel 2520 may further include a control circuit. The touch panel 2520 may further include a tactile layer. In this case, the touch panel 2520 may offer a tactile feedback to a user.

The digital pen sensor 2540 may be formed in the same or similar manner as receiving a touch input or by using a separate recognition sheet. The key 2560 may include, for example, a physical button, an optical key, or a keypad. The ultrasonic input unit 2580 is a specific device capable of identifying data by sensing sound waves with a microphone 2880 in the electronic device 200 through an input tool that generates ultrasonic signals, thus allowing wireless recognition.

The display 2600 (e.g., the display 1600 of FIG. 14) may include a panel 2620, a hologram 2640, or a projector 2660. The panel 2620 may be, for example, LCD, active matrix OLED (AM-OLED), and the like. The panel 2620 may have a flexible, transparent or wearable form. The panel 2620 may be formed of a single module with the touch panel 2520. The hologram 2640 may show a stereoscopic image in the air using interference of light. The projector 2660 may project an image onto a screen, which may be located at the inside or outside of the electronic device 2010. According to an embodiment, the display 2600 may further include a control circuit for controlling the panel 2620, the hologram 2640, and the projector 2660.

The interface 2700 may include, for example, an HDMI 2720, a USB 2740, an optical interface 2760, or a D-subminiature (D-sub) 2780. The interface 2700 may be contained, for example, in the communication interface 1700 shown in FIG. 14. Additionally or alternatively, the interface 2700 may include, for example, a mobile high-definition link (MHL) interface, an SD card/MMC interface, or an infrared data association (IrDA) interface.

The audio module 2800 may perform a conversion between sounds and electric signals. At least part of the audio module 2800 may be contained, for example, in the input/output interface 1400 shown in FIG. 14. The audio module 2800 may process sound information inputted or outputted through a speaker 2820, a receiver 2840, an earphone 2860, or a microphone 2880.

The camera module 2910 is a device capable of obtaining still images and moving images. According to an embodiment, the camera module 2910 may include at least one image sensor (e.g., a front sensor or a rear sensor), a lens (not shown), an image signal processor (ISP, not shown), or a flash (e.g., LED or xenon lamp, not shown).

The power management module 2950 may manage electric power of the electronic device 2010. Although not shown, the power management module 2950 may include, for example, a power management IC (PMIC), a charger IC, or a battery or fuel gauge.

The PMIC may be formed, for example, of an IC chip or SoC. Charging may be performed in a wired or wireless manner. The charger IC may charge a battery 2960 and prevent overvoltage or overcurrent from a charger. According to an embodiment, the charger IC may have a charger IC used for at least one of wired and wireless charging types. A wireless charging type may include, for example, a magnetic resonance type, a magnetic induction type, or an electromagnetic type. Any additional circuit for a wireless charging may be further used such as a coil loop, a resonance circuit, or a rectifier.

The battery gauge may measure the residual amount of the battery 2960 and a voltage, current or temperature in a charging process. The battery 2960 may store or create electric power therein and supply electric power to the electronic device 2010. The battery 2960 may be, for example, a rechargeable battery or a solar battery.

The indicator 2970 may show thereon a current status (e.g., a booting status, a message status, or a recharging status) of the electronic device 2010 or of its part (e.g., the AP 2100). The motor 2980 may convert an electric signal into a mechanical vibration. Although not shown, the electronic device 2010 may include a specific processor (e.g., GPU) for supporting a mobile TV. This processor may process media data that comply with standards of digital multimedia broadcasting (DMB), digital video broadcasting (DVB), or media flow.

Each of the above-discussed elements of the electronic device disclosed herein may be formed of one or more components, and its name may be varied according to the type of the electronic device. The electronic device disclosed herein may be formed of at least one of the above-discussed elements without some elements or with additional other elements. Some of the elements may be integrated into a single entity that still performs the same functions as those of such elements before integrated.

Figure 16:
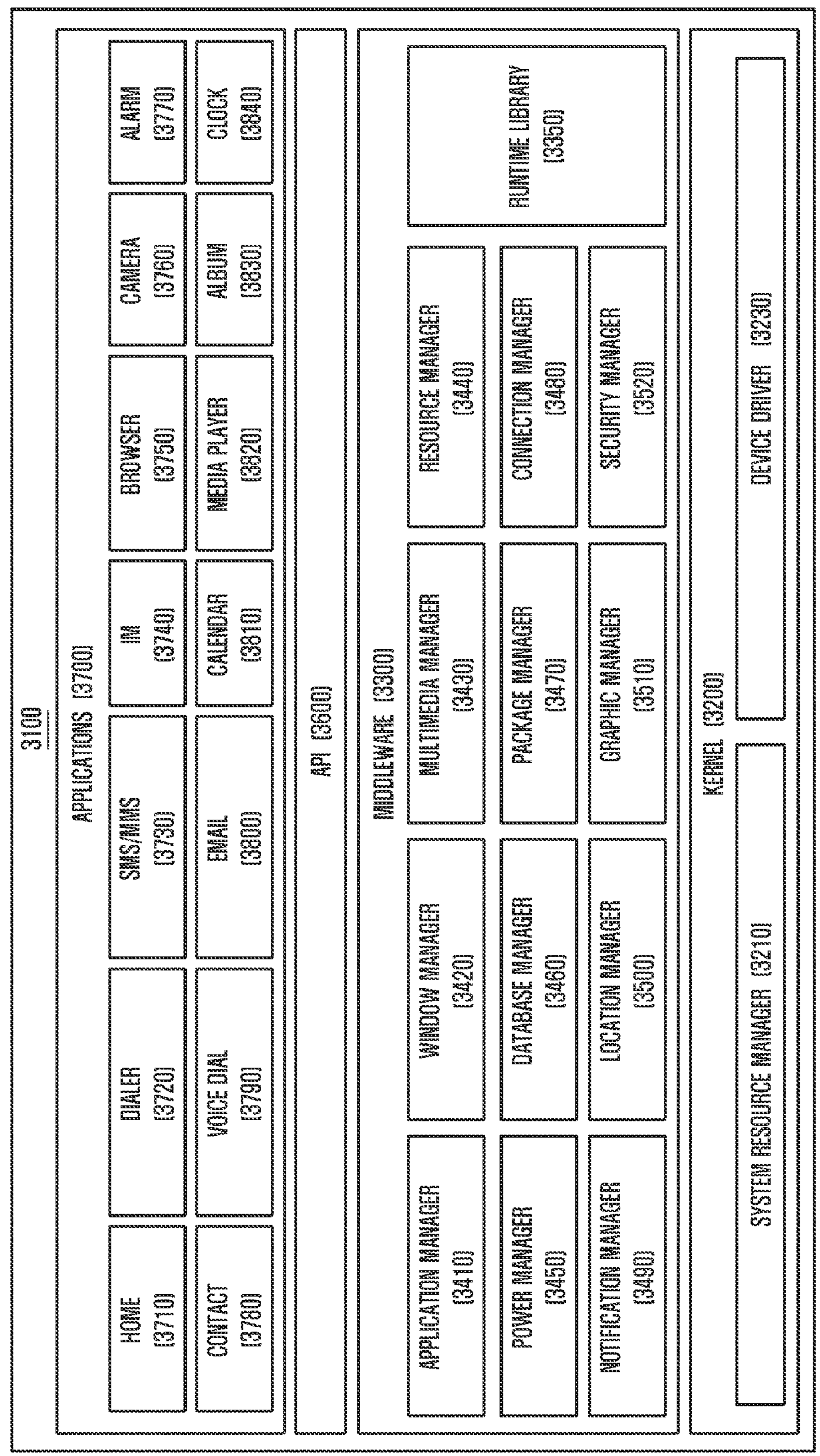
FIG. 16 is a block diagram illustrating a programming module according to various embodiments of the present disclosure.

FIG. 16 is a block diagram illustrating a configuration of a programming module according to an embodiment of the present disclosure.

Referring to FIG. 16, a programming module 3100 may be included (or stored) in the electronic device 1010 (e.g., the program 1400) or may be included (or stored) in the electronic device 2010 (e.g., the memory 2300) illustrated in FIG. 14 or 15. At least a part of the programming module 3100 may be implemented in software, firmware, hardware, or a combination of two or more thereof. The programming module 3100 may be implemented in hardware (e.g., the hardware 2010), and may include an OS controlling resources related to an electronic device (e.g., the electronic device 1010) and/or various applications (e.g., an application 370) executed in the OS. For example, the OS may be Android, iOS, Windows, Symbian, Tizen, Bada, and the like.

Referring to FIG. 16, the programming module 3100 may include a kernel 3200, a middleware 3300, an API 3600, and/or the application 3700.

The kernel 3200 (e.g., the kernel 1410) may include a system resource manager 3210 and/or a device driver 3230. The system resource manager 3210 may include, for example, a process manager (not illustrated), a memory manager (not illustrated), and a file system manager (not illustrated). The system resource manager 3210 may perform the control, allocation, recovery, and/or the like of system resources. The device driver 3230 may include, for example, a display driver (not illustrated), a camera driver (not illustrated), a BT driver (not illustrated), a shared memory driver (not illustrated), a USB driver (not illustrated), a keypad driver (not illustrated), a Wi-Fi driver (not illustrated), and/or an audio driver (not illustrated). Also, according to an embodiment of the present disclosure, the device driver 3230 may include an inter-process communication (IPC) driver (not illustrated).

The middleware 3300 may include multiple modules previously implemented so as to provide a function used in common by the applications 3700. Also, the middleware 3300 may provide a function to the applications 3700 through the API 3600 in order to enable the applications 3700 to efficiently use limited system resources within the electronic device. For example, as illustrated in FIG. 16, the middleware 3030 (e.g., the middleware 1430) may include at least one of a runtime library 3350, an application manager 3410, a window manager 3420, a multimedia manager 3430, a resource manager 3440, a power manager 3450, a database manager 3460, a package manager 3470, a connectivity manager 3480, a notification manager 3490, a location manager 3500, a graphic manager 3510, a security manager 3520, and any other suitable and/or similar manager.

The runtime library 3350 may include, for example, a library module used by a compiler, in order to add a new function by using a programming language during the execution of the application 3700. According to an embodiment of the present disclosure, the runtime library 3350 may perform functions which are related to input and output, the management of a memory, an arithmetic function, and/or the like.

The application manager 3410 may manage, for example, a life cycle of at least one of the applications 3700. The window manager 3420 may manage graphical user interface (GUI) resources used on the screen. The multimedia manager 3430 may detect a format used to reproduce various media files and may encode or decode a media file through a codec appropriate for the relevant format. The resource manager 3440 may manage resources, such as a source code, a memory, a storage space, and/or the like of at least one of the applications 3700.

The power manager 3450 may operate together with a basic input/output system (BIOS), may manage a battery or power, and may provide power information and the like used for an operation. The database manager 3460 may manage a database in such a manner as to enable the generation, search and/or change of the database to be used by at least one of the applications 3700. The package manager 3470 may manage the installation and/or update of an application distributed in the form of a package file.

The connectivity manager 3480 may manage a wireless connectivity such as, for example, Wi-Fi and BT. The notification manager 3490 may display or report, to the user, an event such as an arrival message, an appointment, a proximity alarm, and the like in such a manner as not to disturb the user. The location manager 3500 may manage location information of the electronic device. The graphic manager 3510 may manage a graphic effect, which is to be provided to the user, and/or a user interface related to the graphic effect. The security manager 3520 may provide various security functions used for system security, user authentication, and the like. According to an embodiment of the present disclosure, when the electronic device (e.g., the electronic device 1010) has a telephone function, the middleware 3300 may further include a telephony manager (not illustrated) for managing a voice telephony call function and/or a video telephony call function of the electronic device.

The middleware 3300 may generate and use a new middleware module through various functional combinations of the above-described internal element modules. The middleware 3300 may provide modules specialized according to types of OSs in order to provide differentiated functions. Also, the middleware 3300 may dynamically delete some of the existing elements, or may add new elements. Accordingly, the middleware 3300 may omit some of the elements described in the various embodiments of the present disclosure, may further include other elements, or may replace the some of the elements with elements, each of which performs a similar function and has a different name.

The API 3600 (e.g., the API 1450) is a set of API programming functions, and may be provided with a different configuration according to an OS. In the case of Android or iOS, for example, one API set may be provided to each platform. In the case of Tizen, for example, two or more API sets may be provided to each platform.

The applications 3700 (e.g., the applications 1470) may include, for example, a preloaded application and/or a third party application. The applications 3700 (e.g., the applications 1470) may include, for example, a home application 3710, a dialer application 3720, a short message service (SMS)/multimedia messaging service (MMS) application 3730, an instant message (IM) application 3740, a browser application 3750, a camera application 3760, an alarm application 3770, a contact application 3780, a voice dial application 3790, an electronic mail (e-mail) application 3800, a calendar application 3810, a media player application 3820, an album application 3830, a clock application 3840, and any other suitable and/or similar application. The applications 3700 may include one or more applications that may perform a health care function (e.g., a function of measuring a work rate, blood glucose, and the like), an environment information providing function (e.g., a function of providing atmospheric pressure information, humidity information, temperature information, and the like), and the like.

According to an embodiment, the applications 3700 may include an application (hereinafter, referred to as an "information exchange application" for convenience of the description) supporting information exchange between the electronic device (e.g., the electronic device 1010) and an external electronic device (e.g., the electronic device 1020 or 1040). The application associated with exchanging information may include, for example, a notification relay application for notifying an external electronic device of certain information or a device management application for managing an external electronic device.

For example, the notification relay application may include a function of transferring, to the external electronic device (e.g., the electronic device 1020 or 1040), notification information generated from other applications of the electronic device 1010 (e.g., an SMS/MMS application, an e-mail application, a health management application, or an environmental information application). Further, the notification relay application may receive notification information from, for example, the external electronic device and provide the received notification information to the user.

The device management application may manage (e.g., install, delete, or update), for example, a function for at least a part of the external electronic device (e.g., the electronic device 1040) communicating with the electronic device (e.g., turning on/off the external electronic device itself (or some elements thereof) or adjusting brightness (or resolution) of a display), applications executed in the external electronic device, or services provided from the external electronic device (e.g., a telephone call service or a message service).

According to an embodiment, the applications 3700 may include applications (e.g., a health care application of a mobile medical appliance and the like) designated according to attributes of the external electronic device 1020 or 1040. According to an embodiment, the applications 3700 may include an application received from the external electronic device (e.g., the server 1060, or the electronic device 1020 or 1040). According to an embodiment, the applications 3700 may include a preloaded application or a third party application which may be downloaded from the server. Names of the components of the program module 3100 according to the above described embodiments may vary depending on the type of operating system.

According to various embodiments, at least some of the programming module 3100 may be implemented in software, firmware, hardware, or a combination of two or more thereof. At least some of the programming module 3100 may be implemented (e.g., executed) by, for example, the processor (e.g., the processor 2100). At least some of the programming module 310 may include, for example, a module, program, routine, sets of instructions, or process for performing one or more functions.

The term "module" used in this disclosure may refer to a certain unit that includes one of hardware, software and firmware or any combination thereof. The module may be interchangeably used with unit, logic, logical block, component, or circuit, for example. The module may be the minimum unit, or part thereof, which performs one or more particular functions. The module may be formed mechanically or electronically. For example, the module disclosed herein may include at least one of application-specific IC (ASIC) chip, field-programmable gate arrays (FPGAs), and programmable-logic device, which have been known or are to be developed.

According to various embodiments, at least some of the devices (e.g., modules or functions thereof) or the method (e.g., operations) according to the present disclosure may be implemented by a command stored in a computer-readable storage medium in a programming module form. The instruction, when executed by a processor (e.g., the processor 1200), may cause the one or more processors to execute the function corresponding to the instruction. The computer-readable storage medium may be, for example, the memory 1300.

The above-discussed methods have been described herein with reference to flowchart illustrations of user interfaces, methods, and computer program products according to embodiments of the present disclosure. It will be understood that each block of the flowchart illustrations, and combinations of blocks in the flowchart illustrations, may be implemented by computer program instructions. These computer program instructions may be provided to a processor of a general purpose computer, special purpose computer, or other programmable data processing apparatus to produce a machine, such that the instructions, which are executed via the processor of the computer or other programmable data processing apparatus, create means for implementing the functions specified in the flowchart block or blocks. These computer program instructions may also be stored in a computer usable or computer-readable memory that may direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operations to be performed on the computer or other programmable apparatus to produce a computer implemented process such that the instructions that are executed on the computer or other programmable apparatus provide operations for implementing the functions specified in the flowchart block or blocks.

Moreover, each block of the flowchart illustrations may represent a module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As described above, according to the various embodiments of the present disclosure, waterproofing may be implemented using sealing rubbers between a main case and a PCB in a front key structure, thereby making a set having the front key structure light, slim, short, and small. Also, a waterproof membrane between an actuator and a dome of a key may be removed, thereby enhancing the feeling of clicking a key.

Furthermore, since a room created when the rear surface of a PCB is assembled is sealed, when a speaker is mounted in the room, the room may be used as an enclosure, such as a resonance box of the speaker, without separate structures, and various applications are possible.

In addition, waterproofing may be implemented for sets of a three-button key type, a one-button key and left-right touch key type, and a fingerprint recognition key type.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A waterproof key apparatus, as an electronic device, the waterproof key apparatus comprising:
- a main case;
- a key module attached to a side of the main case and comprising a key actuator;
- a window to which the key module is coupled;
- a universal serial bus (USB) coupling module and a printed circuit board (PCB) attached to an opposite side of the main case, with a dome sheet therebetween;
- a key bracket and an antenna cap coupled to the lower portion of the PCB; and
- a sealing part attached between the main case and the PCB to seal the rear surface of the PCB,
- wherein the dome sheet is placed in the center of the PCB such that a sensor-attached button key is coupled thereto, and flexible PCBs (FPCBs) for a touch key are integrally formed on left and right sides of the dome sheet.

2. The waterproof key apparatus of claim 1, wherein the sealing part comprises a plurality of sealing rubbers.

3. The waterproof key apparatus of claim 2, wherein the waterproof EMBO overlaps the PCB while spreading radially.

4. The waterproof key apparatus of claim 1, wherein a PCB rear-side assembly is assembled to the rear surface of the PCB such that a sealed room which is to be used as a resonance box of a speaker is formed.

5. The waterproof key apparatus of claim 1, wherein a metal device antenna (MDA) is embodied with a liquid crystal display (LCD) bracket, by insert-molding a rear bracket to the main case and electrically connecting the rear bracket to the LCD bracket.

6. The waterproof key apparatus of claim 1, wherein the dome sheet is placed in the center of the PCB such that a home key is coupled thereto, and FPCBs for a touch key are integrally formed on the left and right sides thereof.

7. The waterproof key apparatus of claim 1, wherein the sensor-attached button key comprises a button, a horizontal extending piece that horizontally extends from a side of the button, a bent piece vertically bent downward from the horizontal extending piece, and a sensor attached to the bent piece.

8. The waterproof key apparatus of claim 7, wherein the bent piece protrudes downward from the main case through an injection hole of the main case and is bent toward the rear surface of the PCB to bring the sensor close to the rear surface of the PCB.

9. A waterproof key apparatus, as an electronic device, the waterproof key apparatus comprising:
- first and second main cases;
- a key module attached to the second main case and including a key actuator;
- a printed circuit board (PCB) mounted on the lower portion of the first main case, with a dome sheet therebetween; and
- a sealing part attached between the first main case and the PCB to seal the rear surface of the PCB,
- wherein the dome sheet is placed in the center of the PCB such that a sensor-attached button key is coupled thereto, and flexible PCBs (FPCBs) for a touch key are integrally formed on left and right sides of the dome sheet.

10. The waterproof key apparatus of claim 9, wherein the sealing part comprises a plurality of sealing rubbers.

11. The waterproof key apparatus of claim 10, wherein the waterproof EMBO of the sealing part overlaps the second main case.

* * * * *